No. 631,262. Patented Aug. 15, 1899.
T. REILLY.
BRAKE SYSTEM FOR STREET CARS.
(Application filed Dec. 12, 1898.)
(No Model.) 4 Sheets—Sheet 1.
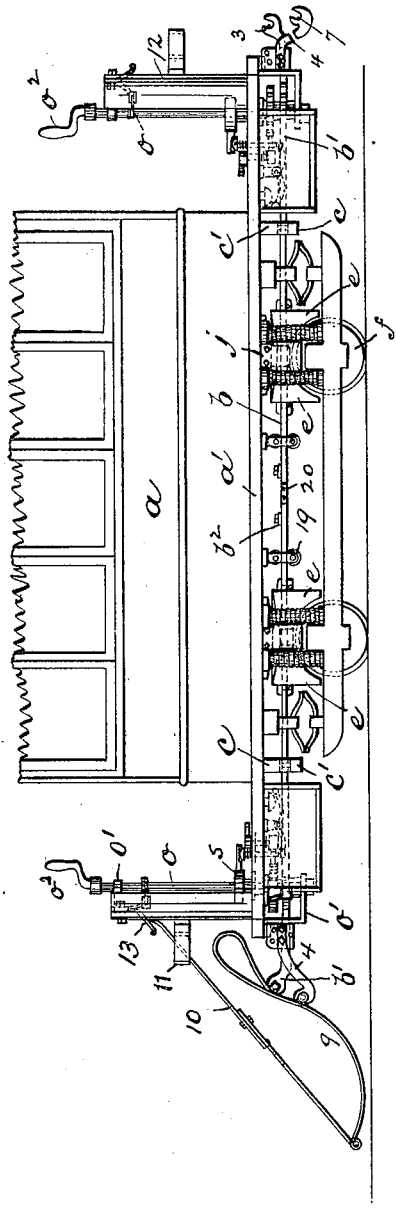
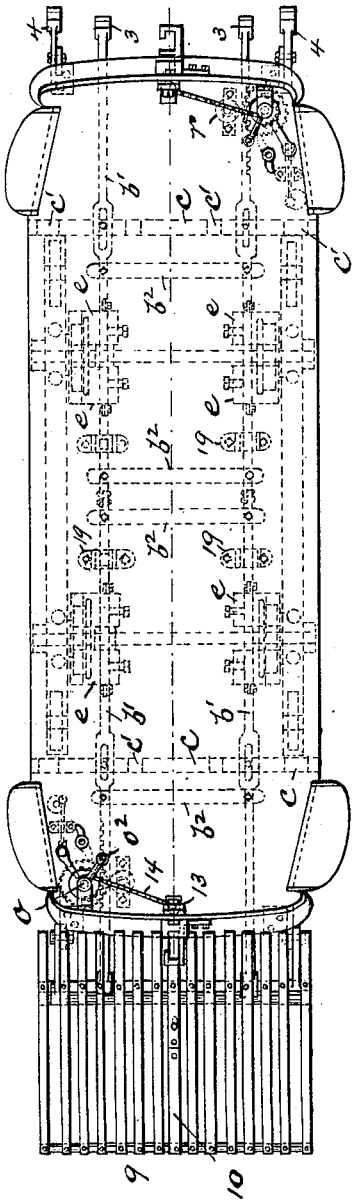
WITNESSES:
INVENTOR:
Thomas Reilly,
BY
Drake & Co.
ATTORNEYS.

No. 631,262. Patented Aug. 15, 1899.
T. REILLY.
BRAKE SYSTEM FOR STREET CARS.
(Application filed Dec. 12, 1898.)

(No Model.) 4 Sheets—Sheet 2.

WITNESSES: INVENTOR
Thomas Reilly,
BY Drake & Co.
ATTORNEYS.

No. 631,262. Patented Aug. 15, 1899.
T. REILLY.
BRAKE SYSTEM FOR STREET CARS.
(Application filed Dec. 12, 1898.)
(No Model.) 4 Sheets—Sheet 3.
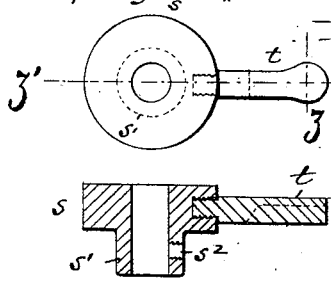
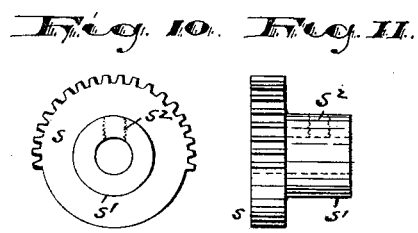
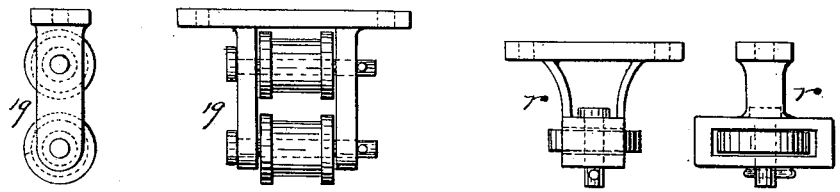
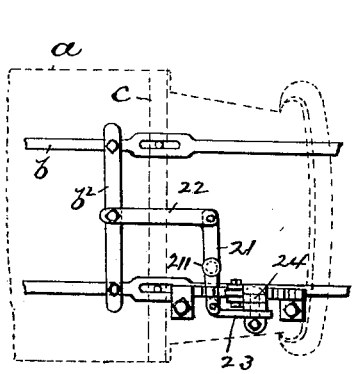
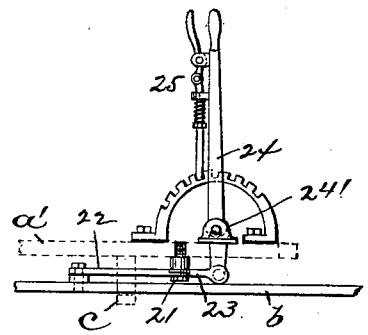
WITNESSES:
INVENTOR:
Thomas Reilly,
BY Drake &Co.
ATTORNEYS.

No. 631,262. Patented Aug. 15, 1899.
T. REILLY.
BRAKE SYSTEM FOR STREET CARS.
(Application filed Dec. 12, 1898.)
(No Model.) 4 Sheets—Sheet 4.
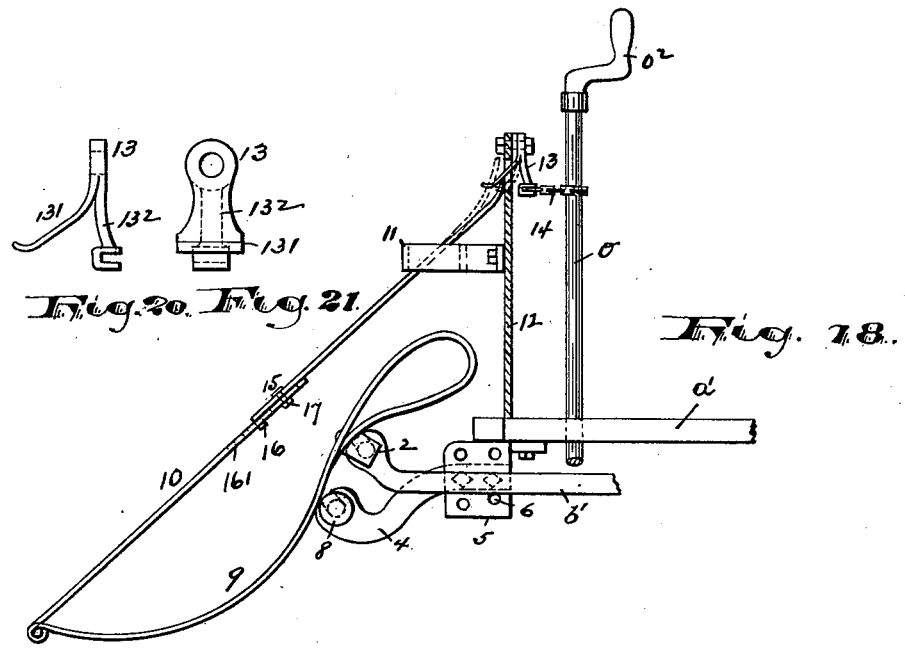
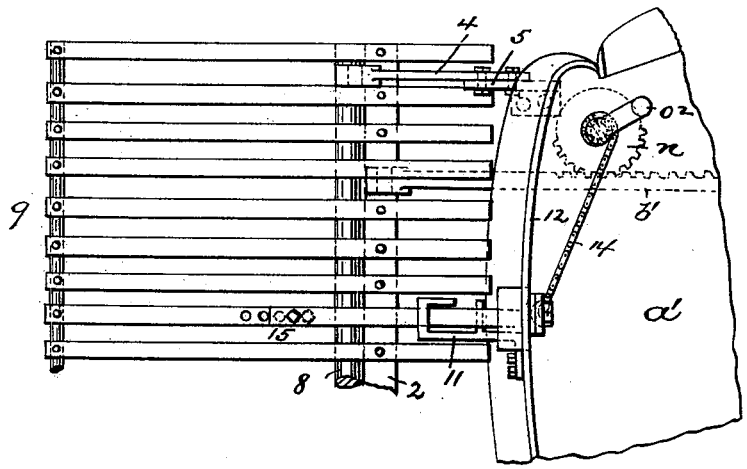
WITNESSES: A. R. Krousse. Russell M. Everett.
INVENTOR: Thomas Reilly,
BY Drake & G.
ATTORNEYS.

UNITED STATES PATENT OFFICE.

THOMAS REILLY, OF NEWARK, NEW JERSEY, ASSIGNOR OF ONE-HALF TO MARY E. LYNCH, OF SAME PLACE.

BRAKE SYSTEM FOR STREET-CARS.

SPECIFICATION forming part of Letters Patent No. 631,262, dated August 15, 1899.

Application filed December 12, 1898. Serial No. 699,088. (No model.)

*To all whom it may concern:*

Be it known that I, THOMAS REILLY, a citizen of the United States, residing at Newark, in the county of Essex and State of New Jersey, have invented certain new and useful Improvements in Brake Systems for Street-Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to secure a more effective brake, to provide means for applying said brake to the wheels of a street-car which may be easily operated by the motorman, to obtain such a connection of the brakes and fender that an application of the brakes will cause the fender to be lowered closer to the ground, to provide automatic means for holding the fender in such depressed position until freed by releasing the brakes, to provide means for ringing the gong automatically as the brake is applied, and to secure other advantages and results, some of which may be referred to hereinafter in connection with the description of the working parts.

The invention consists in the improved brake system for street-cars and in the arrangements and combinations of parts of the same, all substantially as will be hereinafter set forth, and finally embraced in the clauses of the claim.

Figure 3:
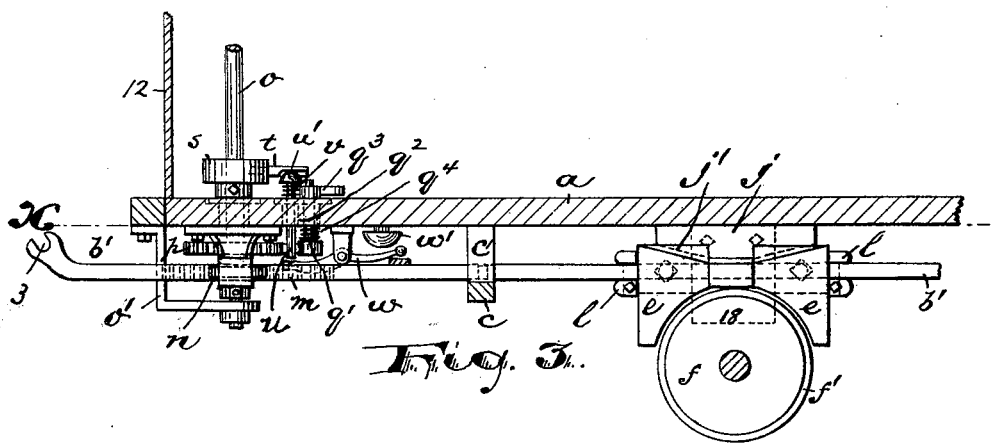
Figure 4:
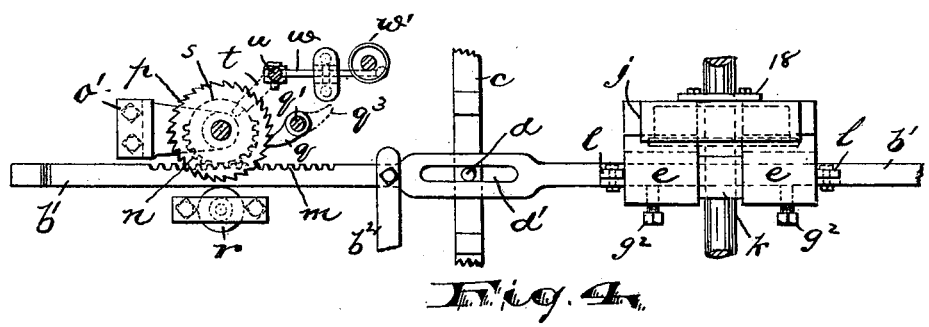
Figures 5, 6:
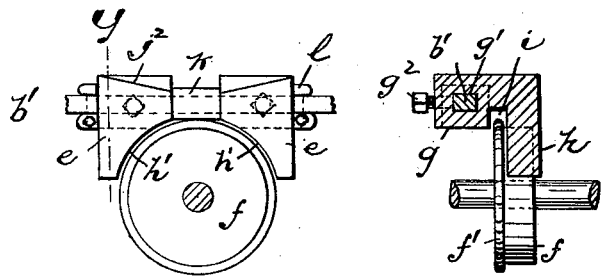

Referring to the accompanying drawings, in which like letters and numerals of reference indicate corresponding parts in each of the several views, Figure 1 is a side elevation of a car having my brake system applied. Fig. 2 is a plan view of the same. Fig. 3 is a central vertical section of a portion of the end of the car with the fender removed and showing the arrangements of parts in detail. Fig. 4 is a plan view of the parts shown in Fig. 3, being taken at section-line $x$. Fig. 5 is a side elevation of one of the wheels and showing the brake-frame and brake-shoes thereon in their normal relation to the wheel. Fig. 6 is a sectional end view on line $y$, Fig. 5. Fig. 7 is a detail plan of a certain tripping-wheel adapted to ring the gong. Figs. 8 and 9 are sectional views of the same on lines $z$ and $z'$, respectively, Fig. 7. Fig. 10 is an end view of a certain brake-operating gear-wheel, and Fig. 11 is an edge view of the same. Figs. 12 and 13 are end and front views, respectively, of a roller-bearing for the brake-frame. Figs. 14 and 15 are front and side elevations, respectively, of a certain friction-roller. Fig. 16 shows a modification of construction in which a system of levers is used for operating the brakes, and Fig. 17 is a plan of the same, the car-body being indicated in dotted lines. Fig. 18 is a side elevation showing means for holding the fender in depressed position. Fig. 19 is a plan view of the same; and Figs. 20 and 21 are side and front views, respectively, in detail, of a certain catch.

In said drawings, $a$ indicates the body of a street-car of any ordinary construction, and $a'$ the bottom or floor of said car.

$b$ indicates a rigid framework supported in a horizontal position beneath the car-bottom, being attached either to the car-body or to the truck and comprising side pieces $b'$ $b'$, which extend longitudinally from end to end of the car, and cross bars or braces $b^2$, fastened at each end to the side pieces and serving to rigidly hold the same in proper relative position. The frame $b$ is preferably supported at or near the ends of the car by horizontal cross-beams $c$, fixed to the lower ends of vertical posts or brackets $c'$, depending from the car-bottom. The side pieces $b'$ of the frame rest upon the upper surfaces of said cross-beams $c$ and slide thereon, said side pieces being longitudinally slotted, as at $d'$, to receive a pin $d$, projecting from the beams $c$, whereby lateral movement of the frame is prevented. On said side bars $b'$ of the frame $b$ are arranged, at the front and rear of each wheel, opposite brake-shoes $e$ $e$, referring more especially to Figs. 3, 4, 5, and 6. Said brake-shoes are L-shaped in end view, as shown in Fig. 6, having a horizontal portion $g$, extending inward beneath the car, and a vertical part $h$, lying in the plane of the car-wheel $f$. The horizontal arm $g$ is perforated, as at $g'$, in the direction of the length of the car to receive the side bar $b'$ of the frame $b$. Said perforation is preferably square to prevent twisting of the shoe $e$ upon the side piece $b'$, and a set-screw $g^2$ may be employed for further security.

At the edge of the vertical portion $h$ of the brake-shoe adjacent to the periphery of the wheel $f$ is formed a bearing-surface $h'$, conforming in curvature to the circumference of the wheel, so that when the shoe is moved longitudinally toward the wheel said bearing engages the periphery. As a precaution against the shoe slipping outwardly off of the rim of the wheel, the under side of the horizontal portion $g$ of the brake is recessed adjacent to the vertical arm, as at $i$, to receive the flange $f'$ of the car-wheel.

The upper side of the brake-shoe, directly over the vertical portion $h$, is inclined downward toward the wheel, as at $j^2$, and from the under part of the car projects a bearing-block $j$, provided with a correspondingly-inclined bearing $j'$, with which the brake-shoe $e$ will come in contact as it is drawn forward into engagement with the periphery of the wheel, as will be hereinafter more fully described.

The two oppositely-facing brake-shoes on opposite sides of the wheel are held apart by a sleeve $k$, arranged on the side bar $b'$ between them, and the brake-shoes are held firmly against the ends of said sleeve $k$ by pins $l$, passing through the side bars at the outer ends of the shoes.

In operation the frame $b$ is drawn forward, together with the brake-shoes $e$, upon the side bars $b'$ thereof, thus bringing the curved bearing-surface $h'$ of each rear brake-shoe against the periphery of a wheel, the upper inclined bearing $j^2$ coming against the block $j$ and giving firmness and solidity to the brake. On releasing the brakes the shoe, by reason of its wedge shape, is readily withdrawn from between the wheels and bearing-block. To effect this longitudinal motion of the frame $b$ and brakes, the side bar $b'$ of the frame is toothed, preferably at its outer side, so as to form a rack $m$ near its forward end, and a pinion $n$ is provided to intermesh with said rack. Said pinion is fast upon the brake-shaft $o$, which is vertically disposed in bearings $o'$ $o'$ at the forward part of the car-platform in a position convenient to the motorman's right hand, as is usual, being provided at the top with a crank-handle $o^2$. Thus by turning the brake-handle or crank in the ordinary manner the pinion $n$ will be revolved, and the rack $m$ and frame $b$ upon which said rack is formed will be moved longitudinally to apply or release the brakes, as will be understood. A ratchet-wheel $p$, also fast on the brake-shaft $o$, is provided just below the floor of the car, and a pawl $q$ is arranged to engage said ratchet-wheel and hold the brake in locked position. The pawl $q$ projects from the lower end of a short shaft $q'$, which extends up through bearings $q^2$ in the floor of the car, and receives an arm $q^3$, which lies just above the floor and is adapted to be engaged by the foot in operating the pawl. A spiral spring $q^4$, coiled around the shaft $q'$ below the floor and fastened at one end to the bearings $q^2$ and at the other end to the shaft, serves to throw the pawl out of engagement when the ratchet-wheel is slackened, as is usual.

A friction-roller $r$ of any usual construction is arranged opposite the toothed portion of the side bar $b'$ to hold the rack formed thereon in engagement with the pinion.

Above the car-floor I place upon the brake-shaft $o$ a tripping-wheel $s$, having a hub $s'$, adapted to receive a set-screw, as at $s^2$, by means of which the wheel can be made fast upon the shaft in any desired position. Said wheel carries a radially-projecting arm $t$, which has its end oppositely beveled downward, as clearly shown in Fig. 8. Said arm is preferably screwed into the periphery of the wheel, although the connection may be formed in any other suitable manner.

The tripping-arm $t$ as the brake-shaft is revolved by means of the crank $o^2$ engages at its beveled sides the head $u'$ of a bolt $u$, said bolt being held up in normal position by a spring $v$ and at its lower end acting against the end of a pivoted hammer $w$, adapted to strike a gong $w'$ in the usual manner. The tripping-arm $t$ thus depresses the bolt $u$ at every rotation or oscillation of the brake-shaft, and the construction described thus secures the ringing of the gong automatically whenever the brakes are applied, as will be seen. At other times the gong may be rung by the foot in the usual way; but I prefer to form teeth on only a portion—say one-half—of the periphery of the cog-wheel or pinion $n$, so that the brake-shaft may be given an oscillating movement through a short arc without moving the brake-frame, and thus the gong can be rung at pleasure.

The ends of the side bars $b'$ of the frame $b$ project forwardly beyond the car and support and control the fender 9 in a manner now to be described.

The fender itself is of any usual construction and occupies, substantially, the usual position at the front of the car, one of its cross-pieces, as 2, being made round at the ends to be pivotally seated in sockets 3 3, formed at the ends of the side bars $b'$ of the brake-frame $b$. Arms 4 4 project from the body of the car, being adjustable to different heights by the usual means of plates 5, perforated with holes 6, through any of which the bolts securing said arms to the plates are passed. Bearings 7 are formed at the outer ends of said arms, and in said bearings rest the ends of transverse roller 8, which lies against the rear or under side of the fender 9. By this construction when the brake-frame $b$ is moved forward in the operation of applying the brakes the side bars $b'$, at the ends of which the fender is supported, push the upper part of said fender forwardly from the car-body. The fender as a whole moves pivotally upon the roller 8, being held thereagainst by gravity, and the lower end of the fender is brought nearer the ground. Thus at the same time the motorman applies the brakes to stop the car from running over any person or object on the track the fender is automatically brought into better position to prevent said person or object from being carried under the wheels.

To secure the retention of the fender in its lowered position, I have provided a rigid rod 10, pivoted at its lower end to about the middle point of the front edge of the fender and extending upward through a guide 11 into close proximity to the front of the dashboard 12 of the car. To the inner side of said dashboard is pivoted an inverted-V-shaped catch 13, one arm 131 of which projects through a suitable opening in the dashboard and lies with its end against the outer side of the rod 10. Said arm 131 is elastic and by the pressure of the rod 10 is forced nearer to the dashboard than it would normally stand. When, therefore, the fender is depressed, as above described, and the upper end of the rod 10 slips down below the arm 131 of the catch 13, said arm springs outward by its elasticity and holds the rod down in its lowered position, as more particularly shown in Fig. 18.

To automatically release the rod and fender from lowered position, I have secured to the inner arm 132 of the catch 13 a chain 14, which passes around the brake-shaft $o$ and has its end made fast thereto. Said chain is carried around the brake-shaft in such a direction that as said shaft is rotated to release the brakes the chain 14 is wound upon the shaft, producing a draft on the arm 132 of the catch 13 and swinging said catch upon its pivot to throw the arm 131 out of engagement with the end of the rod 10, all as will be understood upon reference to Figs. 18 and 19. Said rod 10 is preferably made in sections, the overlapping ends of which are adjustably coupled, as at 15, where a lug 16 at the end of one section is adapted to enter one of a series of openings 161 in the other section, a bolt 17 then passing through both ends.

It will be understood that both ends of the car are provided with my improved devices and that the brake-frame may be moved in either direction, according as the car is moving, to cause the rear shoe $e$ of each pair to engage a wheel. The gear-wheel $n$ at the rear of the car is intended to be left with that portion of its periphery which is entire or devoid of teeth adjacent to the rack $m$ on the side bar $b'$, and thus as the side bar moves longitudinally in operating the brakes from the forward end of the car the cog-wheel and brake-shaft at the rear platform will not be rotated.

Guards 18 may project vertically downward from the bearing-block $j$ to prevent the brake-shoes $e$ from slipping off of the rim of the wheel $f$, if desired. Roller-bearings 19, as shown in detail in Figs. 12 and 13, may depend from the car-bottom, if desired, to support and guide the side pieces $b'$ of the brake-frame $b$, and said side pieces may be in sections or members joined or coupled together, as at 20, at the middle of the car.

Although I usually prefer to operate the brake-frame by the rack and pinion, brake-shaft, and crank, as described, I may under some conditions employ levers 21 24, as shown in Figs. 16 and 17. In this modification of construction a transverse lever 21 is pivoted, as at 211, in a horizontal position under the car-platform. A link 22 connects the inner end of this lever 21 to a cross-bar $b^2$ of the frame $b$ and a similar link 23 joins the outer end of the opposite arm of the lever 21 to the lower end of an operating-lever 24. Said operating-lever extends upward through the floor of the car, being provided with bearings 241 thereon, and has its upper end in a position convenient for manipulation. A spring-catch 25 of any ordinary construction is provided to hold the lever 24 fixed in any desired position.

It will be evident that other modifications may be made without departing from the spirit and scope of the invention, and I do not wish to limit myself by the positive terms used in describing the details of construction I use in carrying my invention into effect, but desire to protect the broad idea of automatically sounding the gong and manipulating the fender as the brakes are applied.

It will further be noted that my peculiar form of brake-shoe can be employed in connection with the wheels of any form of vehicle or for an emergency-brake, and I do not wish to limit its use to street-cars alone.

Having thus described the invention, what I claim as new is—

1. The combination with a street-car, of a sliding frame supported beneath the car, means for moving said frame longitudinally, brake-shoes arranged on said frame, each having a bearing-surface to engage the wheel and an upper inclined bearing, and a rigid block having a correspondingly-inclined bearing against which the top of the shoe impinges in forcing the shoe against the wheel, substantially as set forth.

2. The combination in a street-car, of a horizontal frame sliding longitudinally beneath the car and comprising side pieces rigidly held in relative position by cross-braces, means for reciprocating said frame, an inclined bearing-block arranged adjacent to a wheel of the car and a wedge-shaped brake-shoe carried by the side piece of said frame and adapted to be forced between the periphery of the wheel and said inclined bearing by movement of said frame, substantially as set forth.

3. The combination of a horizontal frame, longitudinally sliding beneath the car and comprising side pieces and rigidly-connecting cross-bars, a rack formed near the end of one of said side pieces, a pinion and brake-shaft for reciprocating said frame, bearing-blocks arranged above the wheels, each block being oppositely and upwardly inclined away from the wheel, and brake-shoes carried by the said side pieces at the front and rear of each wheel and adapted to be forced between the wheels and said inclined bearing-blocks, substantially as set forth.

4. In a car, the combination with a longitudinal supporting-bar, of a brake-shoe arranged on said bar, said shoe having a horizontal portion extending in under the car and being perforated to receive the said bar, and a vertical outer portion lying in the plane of the car-wheel, and adapted to engage said wheel as the shoe moves longitudinally with respect to the car, substantially as set forth.

5. The combination with a wheel and inclined bearing-block forming with the periphery of said wheel a flaring space, of a brake-shoe having its upper side inclined in correspondence to said bearing and its lower side shaped to conform to the periphery of the wheel, and means for forcing said shoe into said flaring space, substantially as set forth.

6. The combination with a longitudinal supporting-bar, of a pair of brake-shoes arranged on said bar at the front and rear of each wheel, a sleeve on said bar holding said shoes apart and pins passing through the supporting-bar at the outer ends of said shoes and holding them against said sleeve, substantially as set forth.

7. In a street-car having a vertical brake-shaft for operating the brakes, the combination with said shaft of a tripping-wheel made fast thereon, said tripping-wheel being adapted to engage, as the brake-shaft is revolved, the head of a vertically-sliding bolt, and a gong operated by said bolt, substantially as set forth.

8. The combination with the brake-shaft and crank for operating the brakes, of a tripping-wheel fast upon said shaft and comprising a wheel having a radially-projecting arm beveled at its extremity to engage and depress a trip-bolt, said bolt, and a gong operated thereby, substantially as set forth.

9. The combination of the frame $b$, rack $m$, formed thereon, brake-shaft $o$, and pinion $n$, engaging said rack, ratchet-wheel $p$ and pawl $q$, tripping-wheel $s$, and gong $w$, substantially as set forth.

10. The combination with the brake-frame sliding upon cross-beams $c$, and slotted to receive pins projecting from said beams, said frame having a rack formed thereon, of a brake-shaft provided with a brake-handle, bearings for said shaft, a pinion fixed on said shaft and intermeshing with said rack, a ratchet-wheel fast on said shaft, a pawl for said ratchet-wheel, and a friction-roller holding said rack into engagement with said pinion, substantially as set forth.

11. The combination of the brake-shaft $o$, extending through the floor of the car, a ratchet-wheel on said shaft below the car-floor, and a pawl therefor, said pawl comprising a short vertical shaft turning in bearings in the floor, a lower arm projecting into engagement with the ratchet-wheel and an upper arm lying above the floor of the car and adapted to be operated by the motorman's foot, substantially as set forth.

12. The combination with the longitudinally-movable brake-frame, a fender carried at its forward end of said frame, an independent roller holding the fender in an inclined position, said fender turning pivotally upon said roller as the brake-frame reciprocates, substantially as set forth.

13. The combination of a longitudinal brake-frame, a fender carried by said brake-frame, a roller holding said fender in inclined position whereby its forward part is brought nearer the ground by the forward movement of the brake-frame, and means for holding said fender in its depressed position, substantially as set forth.

14. The combination in a street-car, with the pivotally-supported fender adapted to be moved forward to depress the forward end, of a rod extending upward from the front edge of the fender in close proximity to the dashboard, a guide for said rod, and a spring-catch arranged on said dashboard for holding said rod in depressed position, substantially as set forth.

15. The combination with the fender 9, and rod 10, adapted to be automatically depressed on applying the brakes, of a pivoted catch for holding said rod in depressed position, said catch having a forwardly-projecting arm engaging said rod and a rear arm by which said catch is operated, substantially as set forth.

16. In a street-car, the combination of a brake-frame, a fender supported by said frame and adapted to be lowered at its forward end as the brakes are applied, a rod extending upward from the front edge of the fender to the dashboard, a catch pivoted on said dashboard and having a forward arm engaging said rod and a rear arm, and a chain connecting said rear arm to the brake-shaft whereby as the brakes are released said catch is freed from engagement with said rod, substantially as set forth.

17. The combination with a brake-frame, a brake-shaft for operating said frame and a gong, of means attached to said brake-shaft for automatically ringing the gong as the brakes are applied, substantially as set forth.

18. The combination in a street-car, with a brake-frame, a fender carried at the end of said frame, and a gong, of a brake-shaft carrying a pinion and a tripping-wheel whereby the brakes are applied, fender lowered, and gong rung by revolving said shaft, substantially as set forth.

19. The combination with a longitudinal supporting-bar, of a brake-shoe having a horizontal portion providing means for fastening the shoe in place upon the supporting-bar, and a vertical portion adapted at its lower edge to engage the wheel, said horizontal portion having a recess formed therein contiguous to the vertical portion to receive the flange of the wheel, substantially as set forth.

20. In a brake system for cars, the combination of a longitudinally-movable frame having a rack formed thereon near one end, a brake-shaft and crank for operating said frame and a pinion for said shaft and intermeshing with said rack, said pinion being devoid of gear-teeth for a portion of its circumference whereby it can be turned out of engagement with the rack, substantially as set forth.

In testimony that I claim the foregoing I have hereunto set my hand this 28th day of November, 1898.

THOMAS REILLY.

Witnesses:
CHARLES H. PELL,
C. B. PITNEY.